United States Patent [19]

Nagumo

[11] 4,189,751
[45] Feb. 19, 1980

[54] SOLID STATE TELEVISION CAMERA WITH DEFECT COMPENSATION TO REDUCE NOISE

[75] Inventor: Fumio Nagumo, Yokohama, Japan

[73] Assignee: Sony Corporation, Tokyo, Japan

[21] Appl. No.: 790,090

[22] Filed: Apr. 22, 1977

[30] Foreign Application Priority Data

Apr. 30, 1976 [JP] Japan .................................. 51-49458

[51] Int. Cl.² .......................... H04N 3/14; H04N 5/30
[52] U.S. Cl. .................................................. 358/213
[58] Field of Search ........................ 358/167, 213, 212

Primary Examiner—Robert L. Richardson
Attorney, Agent, or Firm—Hill, Van Santen, Steadman, Chiara & Simpson

[57] ABSTRACT

A solid state television camera having a solid state image sensor onto which an image of an object is projected, a sampling hold circuit supplied with an output signal derived from the solid state image sensor, a level detecting circuit for the derived output signal, and a control circuit supplied with an output signal from the level detecting circuit in which a detecting level is selected as a predetermined level at a reference time which differs from the arrival time of the sampling signal by a predetermined time interval. The solid state television camera can remove noise caused by defects in the solid state image sensor by a defect compensating operation.

8 Claims, 34 Drawing Figures

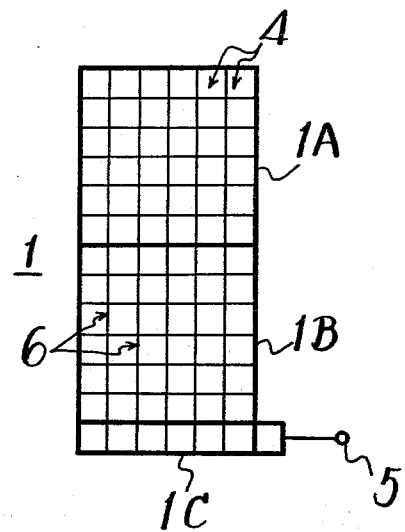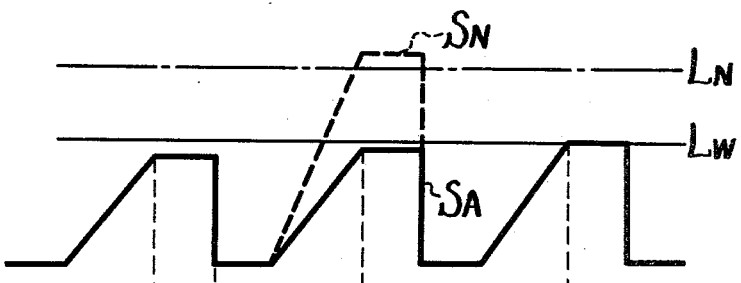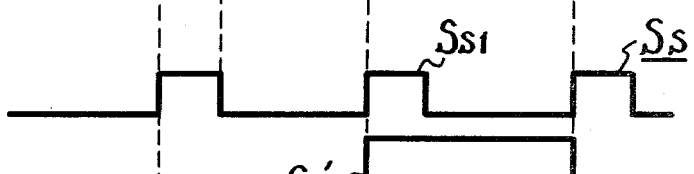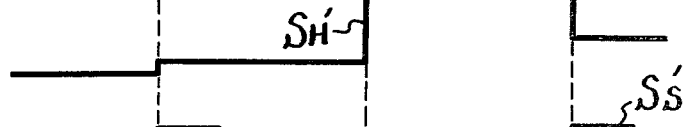

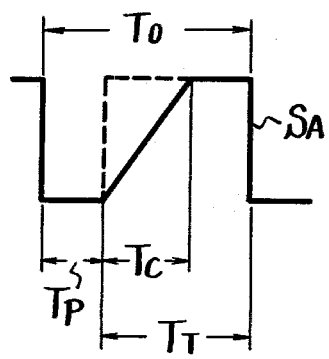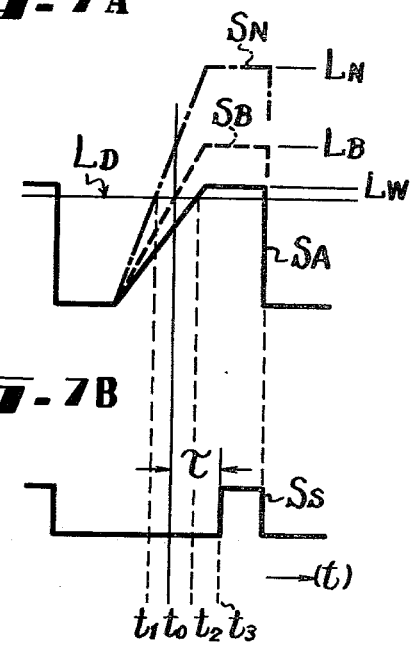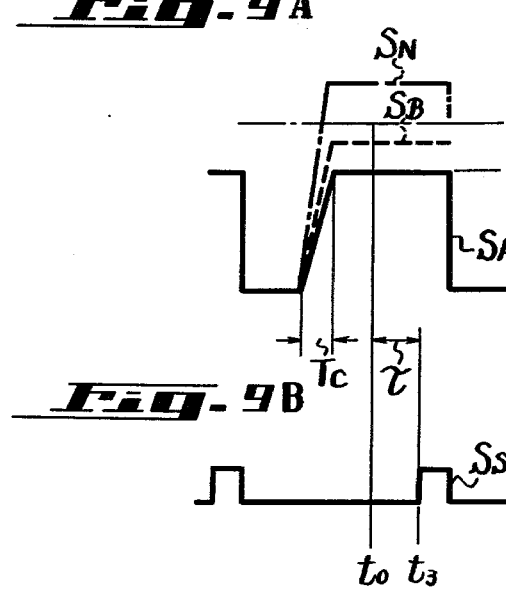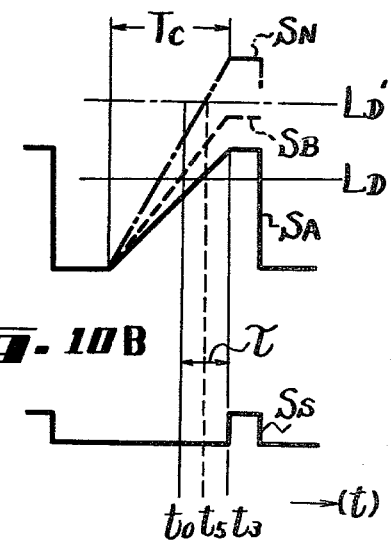

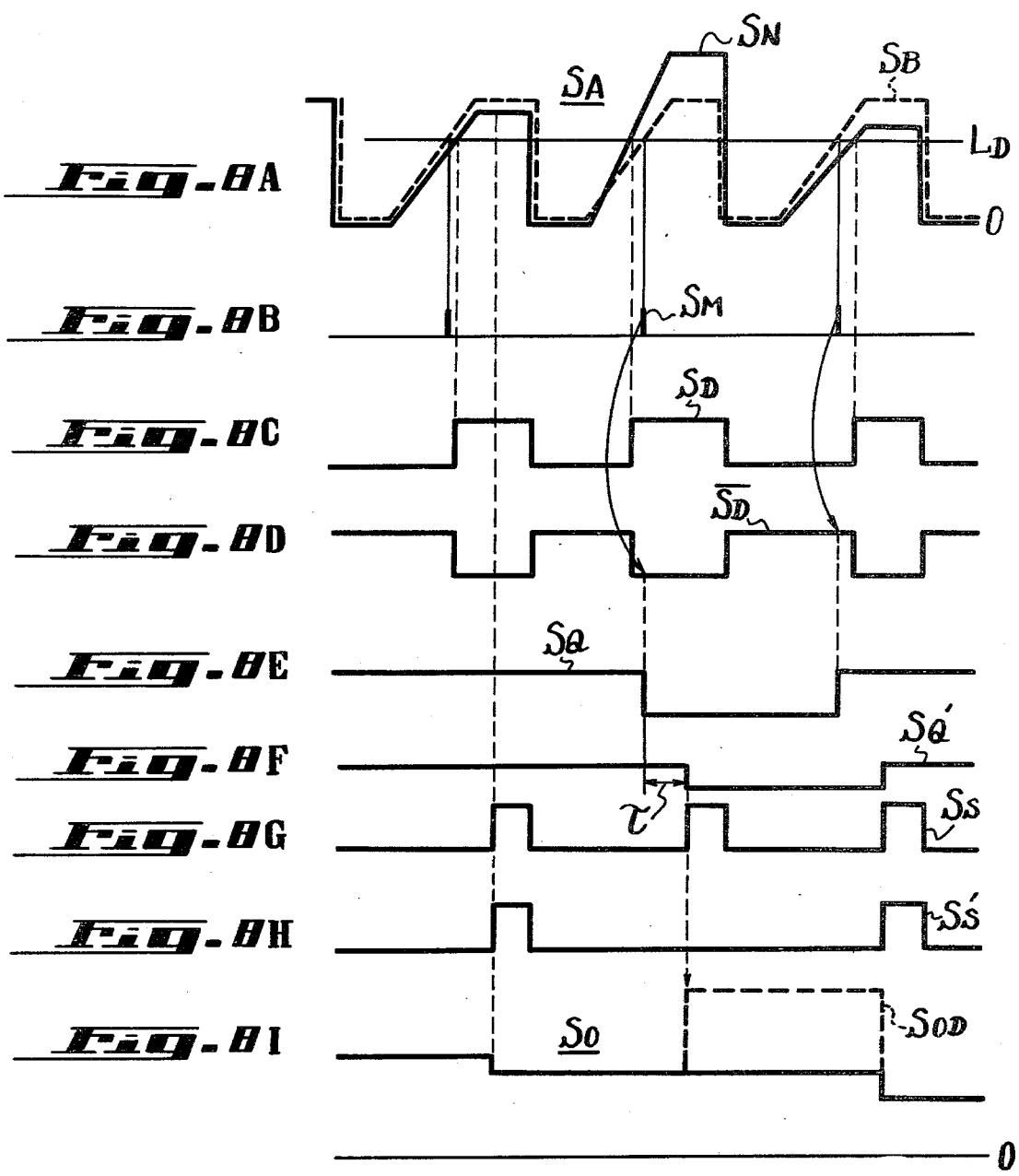

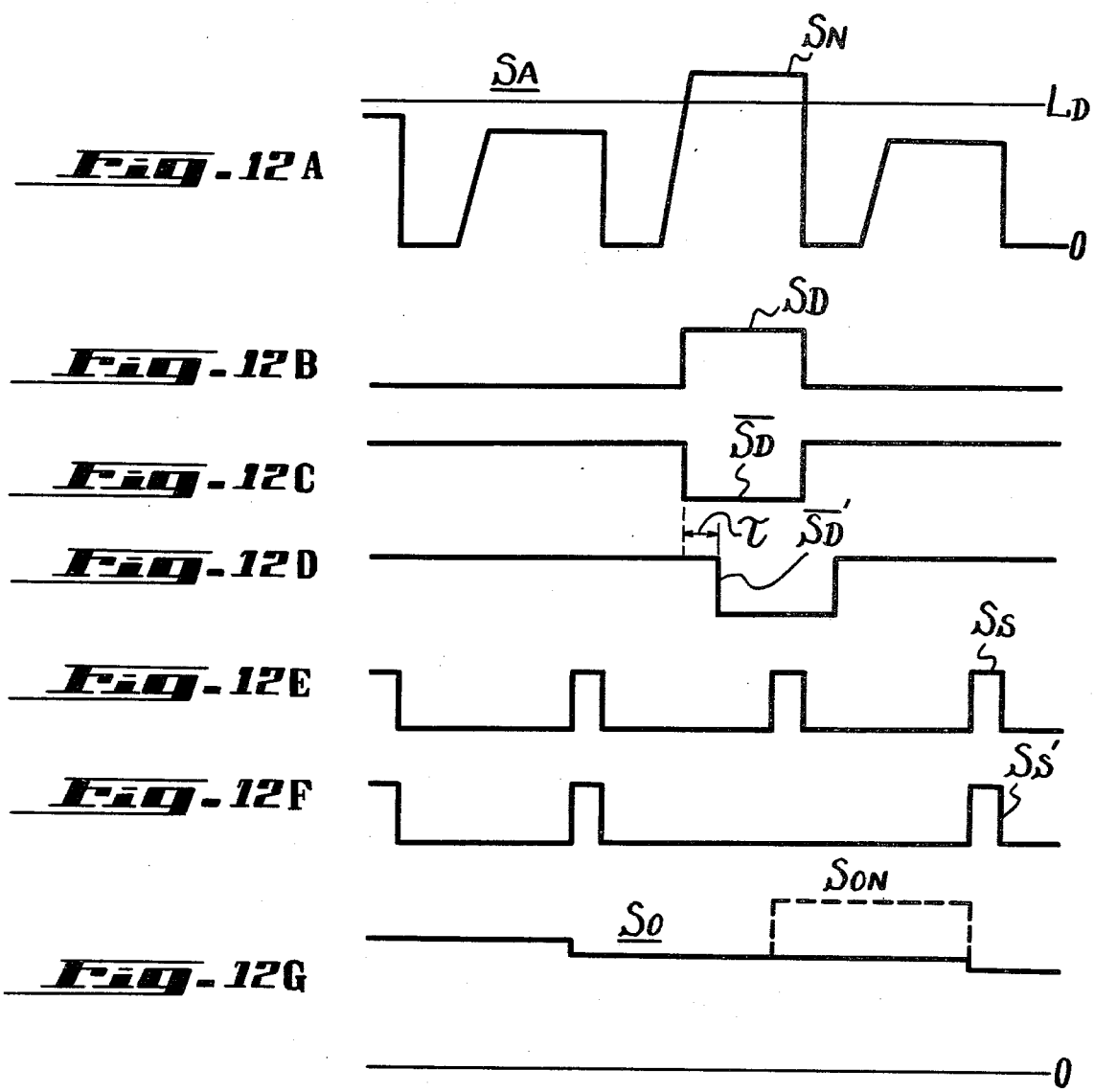

SOLID STATE TELEVISION CAMERA WITH DEFECT COMPENSATION TO REDUCE NOISE

BACKGROUND OF THE INVENTION

1. Field of the Invention

The present invention relates generally to a solid state camera, and more particularly to a solid state television camera which uses a semiconductor element, for example, a charge coupled device as an image sensor.

2. Description of the Prior Art

Solid state television cameras having been proposed in the prior art which use charge coupled devices (hereinafter referred to as CCDs) as solid state image sensors.

The solid state image sensor or CCD used in the solid state television camera is shown in FIG. 1 generally by numeral 1. The CCD 1 is made of a photo sensitive array 1A which consists of a plurality of picture elements 4 arranged on one surface of a semiconductor substrate in horizontal and vertical directions and onto which an object is projected; a temporary storage array 1B which is substantially the same as the photo sensitive array 1A except that it is shielded optically and stores carriers corresponding to received light information of an object; and a read-out resistor 1C which reads out carriers during each horizontal scanning period from the temporary storage array 1B. In FIG. 1, an output terminal 5 is extended from the read-out register 1C and 6 channel stoppers, respectively.

Since, in the CCD 1, it is rather difficult to form the crystal of the semiconductor uniform over a predetermined area, crystal defects are produced locally, and electric charges are apt to be produced at those defects by thermal causes. As a result, when the camera using the above CCD picks up an object whose image is projected on the CCD, noise appears in the output signal at non-illuminated portions thereof, where the current is abnormally large. In this case, this noise exceeds the white level, so that it appears in the reproduced picture and is undesirable.

In order to remove such noise, it is sufficient to provide a defect compensating circuit and to control a sampling hold circuit 7 therein to which a read-out or video signal from the CCD 1 is supplied as shown in FIG. 2. Assuming a video signal $S_A$, derived from the CCD1, delivered to the output erminal 5 and fed to an amplifier 13, is a rectangular wave as shown in FIG. 3A. Since the level of a noise signal $S_N$ corresponding to the crystal defect is higher than the white level $L_W$, the noise signal $S_N$ can be shown in FIG. 3A by the dotted line. Thus, a level detecting circuit 8 for the video signal $S_A$ is provided in the noise eliminating circuit 10. In this case, the detecting level of the circuit 8 is set at a desired level, for example, level $L_N$ which is higher than the white level $L_W$ as shown in FIG. 3A. An output $S_D$ obtained from the detecting circuit 8, when the level of a signal fed thereto exceeds the detecting level $L_N$, is supplied to a gate circuit 9, which is supplied with a sampling signal $S_S$, so as to control the gate circuit 9.

In other words, if the gate circuit 9 is turned "off" by the detected output $S_D$ from the detecting circuit 8, a signal $S_{S1}$ corresponding to the inherent sampling signal $S_S$ (refer to FIG. 3B) is eliminated from the output of the gate circuit 9 (accordingly, the final output from the gate circuit 9 is a signal $S_S'$ shown in FIG. 3D). When the signal $S_{S1}$ is eliminated, no sampling operation is carried out. As a result, an output from the sampling hold circuit 7 becomes a waveform $S_H$ as shown in FIG. 3E.

If, however, the above defect compensating operation is not carried out, an output $S_H'$ based upon the corresponding sampling signal $S_{S1}$ is obtained from the sampling hold circuit 7 as shown in FIG. 3C, with the result that the reproduced picture is deteriorated in quality.

Since, in the above defect compensating circuit 10, the output $S_D$ from the level detecting circuit 8 is supplied to the gate circuit 9 to control the sampling signal $S_S$, the detecting operation thereof is delayed due to the response time $\tau$ of the detecting circuit 8. For this reason, in the noise eliminating circuit 10, there is provided at the former stage of the sampling hold circuit 7 a delay circuit or line 11 whose delay time is at least as great as the response time $\tau$. This delay line 11 delays the video signal $S_A$ by a predetermined time and applies the delayed video signal to the sampling hold circuit 7.

As described above, it is necessary to provide the delay line 11 in the noise eliminating circuit 10, so that the waveform of the video signal $S_A$ is distorted by the delay line 11 and hence the solid state camera is deteriorated in fidelity.

Further, since the delay line 11 is costly, the camera becomes more costly to produce.

SUMMARY OF THE INVENTION

Accordingly, it is an object of the present invention to provide a novel solid state television camera.

It is another object of the present invention to provide a solid state television camera which has no delay circuit or line.

It is a further object of the invention to provide a solid state television camera which does not use a delay line but can, nevertheless, achieve defect compensating operation.

According to an aspect of the present invention there is provided a solid state television camera which comprises a solid state image sensor onto which an image of an object is projected and which produces a derived output signal, a sampling hold circuit to which the derived output from said solid state image sensor is supplied, a level detecting circuit for detecting a level of said derived output, and a control circuit supplied with an output from said level detecting circuit and controlling a sampling signal applied to said sampling hold circuit, a detecting level of said detecting circuit being selected as a predetermined level at a reference time which is different from the arrival time of said sampling signal by a predetermined time period.

Other objects, features and advantages of the present invention will be apparent from the following description taken in conjunction with the accompanying drawings.

BRIEF DESCRIPTION OF THE DRAWINGS

FIG. 1 is a schematic illustration showing a CCD used as a solid state image sensor in the invention.

FIGS. 3A to 3E are waveform diagrams used for explaining the operation of the camera shown in FIG. 2.

FIGS. 6 to 10 and 12 are waveform diagrams used for explaining the operation of the example shown in FIGS. 4, 5 and 11.

DESCRIPTION OF THE PREFERRED EMBODIMENTS

An example of the solid state television camera according to the present invention will be hereinafter described with reference to FIG. 4. The example shown in the figure uses three CCDs 1, 2 and 3 each being substantially the same as that shown in FIG. 1 to form a solid state color camera.

Figure 2:
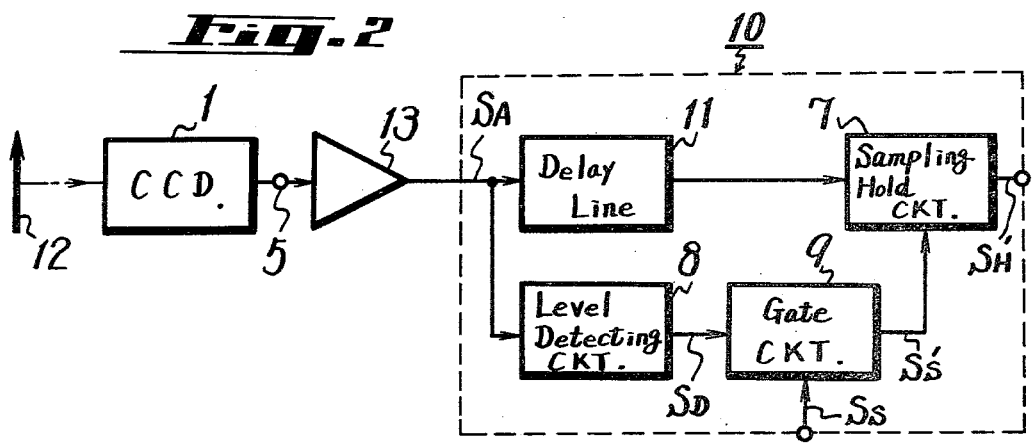
FIG. 2 is a systematic diagram showing a solid state camera.
Figure 4:
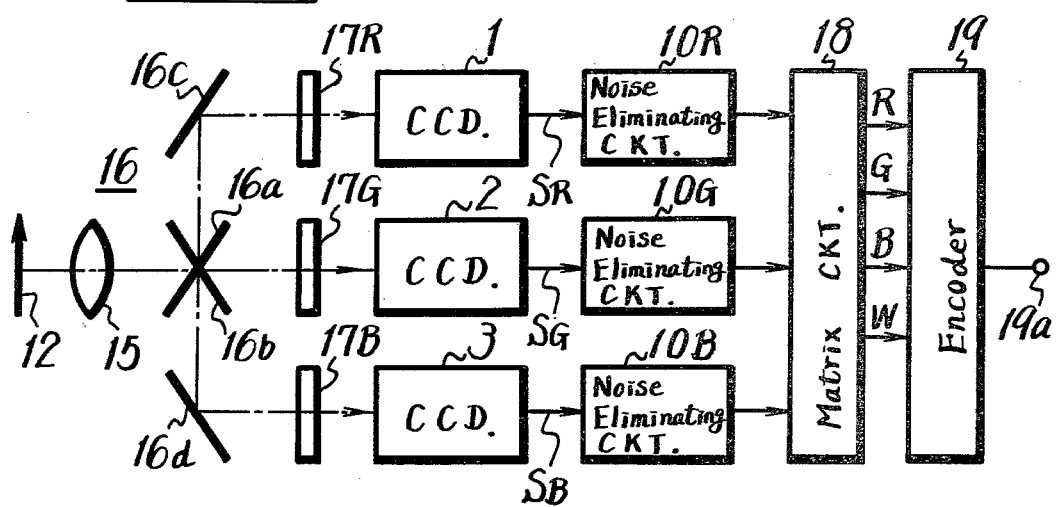
FIG. 4 is a systematic diagram showing an example of the solid state camera according to the present invention.

With the solid state color camera of the invention shown in FIG. 4, the image of an object 12 is projected through a spectrosystem 16, which consists of a lens system 15, a pair of half mirrors 16$a$, 16$b$ and a pair of mirrors 16$c$, 16$d$, on the corresponding CCDs 1 to 3, respectively. In this case, color filters 17R, 17G and 17B which pass single color light, for example, red, green and blue, respectively, are disposed between the mirror 16$c$ and CCD 1, between half mirrors 16$a$, 16$b$ and CCD 2 and between the mirror 16$d$ and CCD 3, so that color separated images are projected onto the CCDs 1 to 3, respectively.

As to the spacial arrangement of the three CCDs 1 to 3, it is possible that if the pitch of the picture elements 4 of each CCD (refer to FIG. 4) in the horizontal direction is taken as $\tau_H$, the respective CCDs 1 to 3 are shifted in the horizontal direction by $\frac{1}{3}\tau_H$ sequentially with respect to one another. Accordingly, the image of the object 12 is projected onto the CCDs 1 to 3 under such a state that the image of the object 12 is shifted by $\frac{1}{3}\tau_H$ relative to an adjacent CCD.

The reason why the above-mentioned relationship is selected is described in U.S. Pat. No. 3,975,760 to accomplish an improvement of resolution without increasing the number of picture elements in the horizontal scanning direction. By this relationship, side-band components mixed in the luminance component are effectively removed by combining the video signals derived from the respective CCDs 1 to 3 in such a way as to prevent the picture quality from being deteriorated.

The video signals $S_R$, $S_G$ and $S_B$ derived from the respective CCDs 1 to 3 are supplied through a circuit 10 (namely 10R, 10G and 10B) by which noise caused by defects in the semiconductor body are removed, and which will be described later, to a matrix circuit 18 whose output signals are applied to an encoder 19. Thus, at an output terminal 19$a$ taken from the encoder 19, there is obtained a composite color video signal of, for example, the NTSC system.

Figure 5:
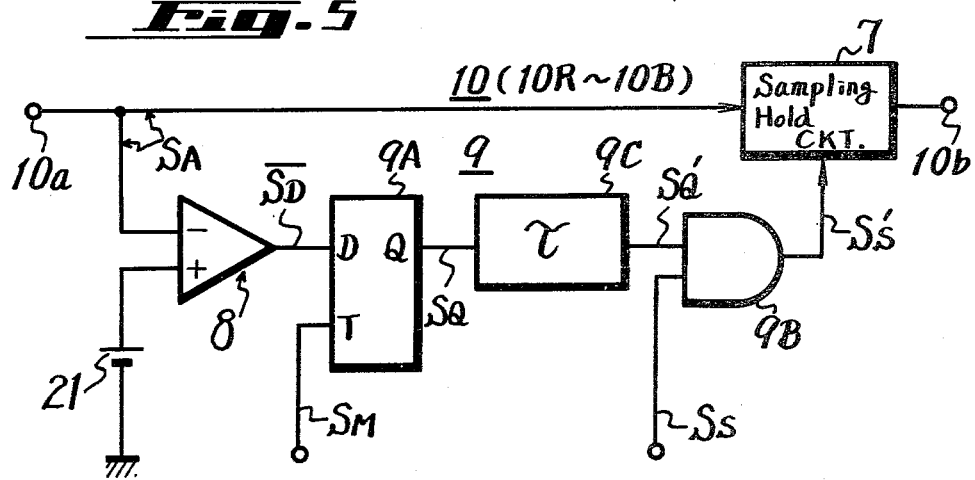
FIGS. 5 and 11 are connection diagrams showing a main part of FIG. 4, respectively.

An example of each of the defect compensating circuits 10 (or 10R, 10G and 10B) will be described with reference to FIG. 5. As shown in FIG. 5, each of the defect compensating circuits 10 comprises a level detecting circuit 8 and a control circuit 9 for the sampling signal $S_S$. The level detecting circuit 8 is formed of an operational amplifier whose one input terminal, for example, the (+) input terminal is connected to a reference voltage source 21 serving as a detecting level $L_D$; its other input terminal or the (−) input terminal is connected to an input terminal 10$a$ to which the video signal $S_A$ is supplied from the CCDs 1 to 3. The manner of setting the detecting level $L_D$ will be described later.

The detected output obtained from the detecting circuit 8 or an inverted output $\bar{S}_D$ in the illustrated example is supplied to a D-terminal of a D-type flip-flop circuit 9A which is one of construction elements of the control circuit 9. The flip-flop circuit 9A is supplied, at its T-terminal, with a reference signal $S_M$.

As described previously, there is a time delay $\tau$ necessary for response to the detecting circuit 8, so that the time delay $\tau$ is expressed by an equivalent circuit 9C. In this case, however, the actual delay occurs at the rear state of the flip-flop circuit 9A, and 9C is shown for explanation only. Thus, the output $S_Q$ of the flip-flop circuit 9A is delayed through the delay line 9C by $\tau$ as an output $S_O$, which is supplied to one input terminal of an AND-circuit 9B whose other input terminal is supplied with the sampling signal $S_S$. Thus, the sampling circuit $S_S$ is controlled by the output signal $S_O$ from the delay line 9C.

Before describing the operation of the defect compensating circuit 10, the derived output or video signal $S_1$ (or $S_R$, $S_G$, $S_B$) will be described with reference to FIG. 6. In FIG. 6, $T_O$ designates the time period necessary for reading out a carrier induced in one picture element 4, $T_P$ a pre-charge time period, and $T_T$ a time period necessary for transferring the carrier. Ideally, the carrier transfer time interval is zero as shown in FIG. 6 by a dotted line. In fact, however, the carrier transfer time period is not zero but has a definite time period due to the operational characteristics of the circuit. Thus, the carrier transfer waveform becomes a trapezoidal shap as shown in FIG. 6 by a solid line. Thus, a time period $T_C$ from the start of carrier transfer to the termination thereof becomes a substantial transfer period. In the example described hereinbelow, the period $T_C$ is taken as the carrier transfer period (time).

The setting of the detecting level $L_D$ of the level detecting circuit 8 of the invention will now be described with reference to FIGS. 7A and 7B. As shown in FIG. 7 A, it is assumed that a transfer waveform of an output signal $S_B$ (dotted line in FIG. 7A) is considered as reference output signal whose final level $L_B$ at the end of transfer is higher than the white level $L_W$ but lower than a level $L_N$ of the noise signal $S_N$.

If the response time of the level detecting circuit 8 is taken as $\tau$, in order to control the sampling signal $S_S$ with the detected output $S_D$ thereof, the time period from the time at which the sampling signal arrives, must be at least $\tau$. If the time, at which the sampling signal $S_S$ is obtained is taken as $t_3$, as shown in FIG. 7, a time $t_0$ before the time $t_3$ is taken as a reference time. A level higher than the output $S_A$ (which represents such an output that produces the white level $L_W$), for example, the level of the reference output $S_B$ at the reference time $t_0$ is selected as the detecting level $L_D$ of the invention.

In the present invention, the reference signal (pulse) $S_M$, which is supplied to the flip-flop circuit 9A is so selected that the frequency of the pulse $S_M$ is the same as that of the sampling signal $S_S$, and the pulse $S_M$ has the phase or time difference $\tau$ from the sampling signal $S_S$. Thus, the time at which the reference signal $S_M$ is obtained coincides with the above reference time $t_0$.

The operation of the defect compensating circuit 10 of the invention under the above assumptions will be described with reference to FIGS. 5 and 8.

The video signal $S_A$, which includes the noise $S_N$ shown in FIG. 8A, will be now considered. When the above video signal $S_A$ is applied to the level detecting circuit 8 produces the detected output signal $S_D$ shown in FIG. 8C. In the example shown in FIG. 5, the inverted output $\bar{S}_D$ shown in FIG. 8D is obtained and then supplied to the D-terminal of the flip-flop circuit 9A. Since the flip-flop circuit 9A is supplied at its T-terminal with the above described reference signal $S_M$, the flip-flop circuit 9A produces at its Q-terminal, the output $S_Q$, which has the level of the inverted output $\overline{S}_D$ at the time when the reference signal $S_M$ is obtained, as shown in FIG. 8E.

Accordingly, the AND-circuit 9B, which is supplied with the output $S_{Q'}$ (FIG. 8F) delayed from the output $S_Q$ by $\tau$ and the sampling signal $S_S$ (FIG. 8G), produces an output $S_{S'}$ from which the sampling signal $S_{Sl}$ corresponding to the noise period is removed, as shown in FIG. 8H. If the output $S_{S'}$ from the AND-circuit 9B is supplied to the sampling hold circuit 7 as the sampling signal, no sampling operation is carried out during the noise generation period, and hence before one picture element interval is produced, the output is held as it is. Thus, the hold output $S_O$ shown in FIG. 8I is derived from the sampling hold circuit 7 and then delivered to the output terminal 10b.

If the sampling operation is maintained without cancelling the sampling signal during the noise generation period, an output $S_{OD}$ which has no relation to the object 12, is obtained as shown in FIG. 8I.

As described above, since the detecting level $L_D$ is selected higher than the output level of the video signal $S_A$ at the time $t_0$, and the reference signal $S_M$ and the detected output $\overline{S}_D$ are applied to the D-type flip-flop circuit 9A which then produces the signal $S_Q$, and this signal $S_Q$ is fed to the delay line 9C which then produces the control output $S_{Q'}$, it can be detected positively whether or not there is noise $S_N$, and accordingly the noise can be removed positively even if the delay circuit 11 is omitted.

According to the present invention, the defect compensating operation can be carried out without using the delay circuit 11, so that the deterioration of the held output $S_O$, caused by the delay circuit 11, can be positively eliminated and hence the camera can be produced at a lower cost.

If the noise elimination circuit 10 is constructed as shown in FIG. 5, such a circuit is effective when it is employed in a device having a short carrier transfer time.

In general, there are various television cameras using a CCD which have short carrier transfer time period $T_C$ (refer to FIG. 9) or long (refer to FIG. 10). When the camera which has a short carrier transfer time is used, there may be no problem. However, in the case where the camera has a long carrier transfer time, if the detecting level $L_D$ is selected higher than the white level $L_W$ similar to the prior art, the time when the noise $S_N$ is detected falls within a time period between the times $t_0$ and $t_3$. Thus, even if the noise $S_N$ is detected, the sampling signal $S_S$ cannot be controlled and hence noise elimination cannot be achieved. Accordingly, in the latter case it is necessary that, similar to the prior art, the sampling signal $S_S$ be previously phase-shifted and also that the video signal $S_A$ to be sampled be delayed by the delay circuit 11.

However, if the reference time $t_0$ is selected as in the present invention, even through the detecting level $L_D$ is selected lower than the white level $L_W$, the noise elimination operation can be carried out positively by using the reference signal $S_C$ and the D-type flip-flop circuit 9A.

Figure 11:
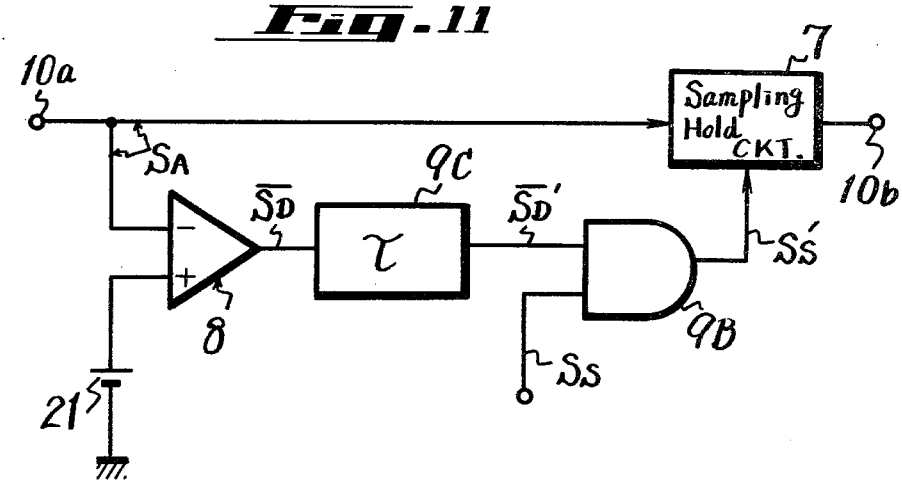

In the case of short transfer times, the detecting level $L_D$ is selected higher than, for example, the white level $L_W$. FIG. 11 is a connection diagram, and FIG. 12 is a waveform diagram used to explain the circuit shown in FIG. 11. As may be apparent from FIG. 11, this circuit does not use any flip-flop circuit.

When the video signal $S_A$ (FIG. 12A) is applied to the level detecting circuit 8, it produces the detected output $S_D$ (FIG. 12B). In the example, the inverse output $\overline{S}_D$ (FIG. 12C) is supplied to the delay line 9C and then delayed by $\tau$ as the output $\overline{S}_{D'}$ (FIG. 12D). The output $\overline{S}_{D'}$ and the sampling signal $S_S$ (FIG. 12E) are supplied to the AND-circuit 9B, which then produces the output $S_{S'}$ from which the sampling pulse corresponding to the noise period is removed as shown in FIG. 12F. The output $S_{S'}$, from the AND-circuit 9B, is supplied to the sampling hold circuit 7 as the sampling signal. Thus, no sampling operation is carried out during the noise generation period, and the held signal before one picture period is obtained as an output corresponding to the noise generation period. Thus, the held output $S_O$ shown in FIG. 12G is delivered from the sampling hold circuit 7 to the output terminal 10b.

According to the example of the invention shown in FIG. 4, the levels of the video signals $S_R$, $S_G$ and $S_B$ obtained from the CCDs 1 to 3 are detected separately, and the noise elimination operation is carried out for each of the video signals separately. It is, however, possible that noise detection and control for the respective signals are carried out by a common circuit.

Figure 13:
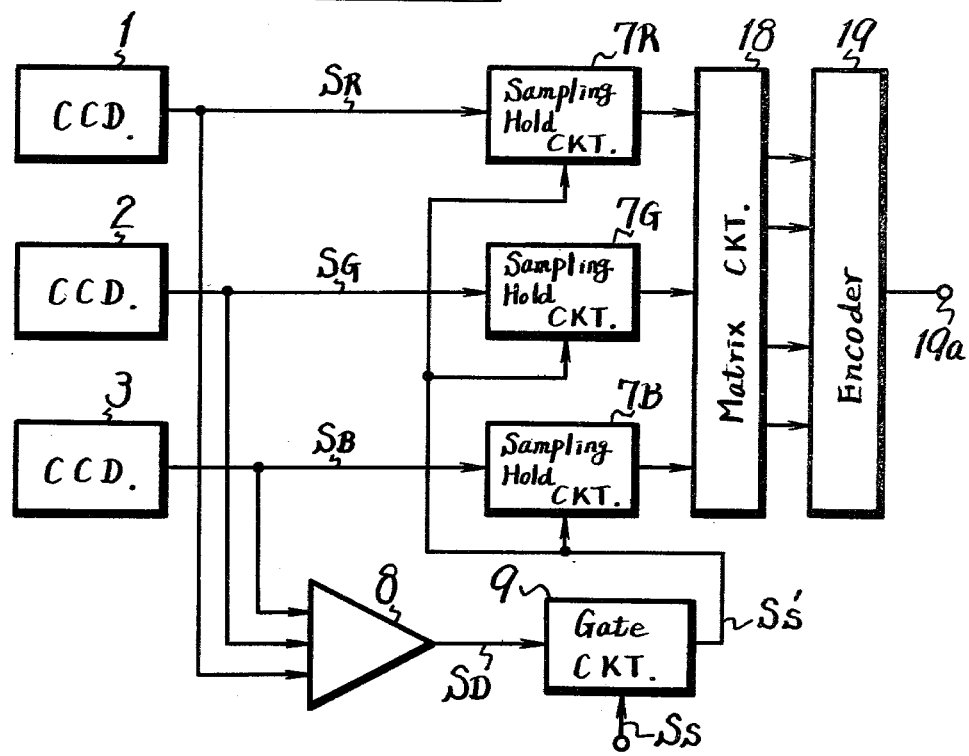
FIG. 13 is a systematic diagram showing another example of the invention.

FIG. 13 is a block diagram showing another example of the invention in which the same numerals as those of FIG. 4 designate the same elements.

As shown in FIG. 13, the common level detecting circuit 8 is provided which is supplied with the video signals $S_R$ to $S_B$ from the CCDs 1 to 3. The detected output $S_D$ from the circuit 8 is fed to the common control circuit 9 which also supplied with the sampling $S_S$. The output $S_{S'}$ from the control circuit 9 is supplied commonly to the sampling hold circuits 7R, 7G and 7B which are provided on the signal transmission paths of the video signals $S_R$ to $S_B$.

The example of the invention shown in FIG. 13 is simple in circuit construction and achieves the same results as those of the example of FIG. 4.

It will be apparent that many modifications and variations of this invention could be effected by those skilled in the art without departing from the scope of the novel concepts described in the preferred embodiments.

I claim as my invention:

1. A solid state television camera comprising:
   a solid state image sensor onto which an image of an object is projected and which produces a derived output signal;
   a sampling hold circuit to which said derived output signal is supplied;
   a level detecting circuit also having said derived output signal supplied thereto and having means for detecting a level of said derived output signal;
   a control circuit supplied with an output from said level detecting circuit and with a sampling signal and having means to control the gating of said sampling signal to said sampling hold circuit; and
   said detecting circuit having a detecting level of said derived output signal which occurs at a reference time which differs from the time of occurrence of said sampling signal by a predetermined time interval.

2. A solid state television camera as claimed in claim 1, wherein the reference time is selected at a time before the arrival of the sampling signal by more than the response time delay ($\tau$) of said level detecting circuit.

3. A solid state television camera as claimed in claim 1, wherein the detecting level is selected at a point on said sampling signal which occurs prior to the occurrence of said sampling signal where the level of said derived output signal is greater than a white level.

4. A solid state television camera as claimed in claim 1, wherein said level is greater than a white level.

5. A solid television camera in which noise is compensated comprising:
- a solid state image sensor onto which an image of an object is projected;
- a sampling hold circuit supplied with a derived output signal from said solid state image snesor;
- a source of sampling signal;
- a control circuit means including a level detecting circuit for comparing a level of said derived output signal with a detecting level at a reference time;
- said control circuit producing an initial control signal corresponding to the presence of said derived output signal at points thereof which are greater than said detecting level;
- means for producing a logical sum of said initial control signal and said sampling signal; and
- said means producing a final control signal and means for applying the final control signal to said sampling hold circuit.

6. A solid state television camera as claimed in claim 1, wherein said level detecting circuit includes an operational amplifier which is also supplied with a reference signal from a reference signal source.

7. A solid state television camera as claimed in claim 6, wherein said control circuit includes a flip-flop circuit which is supplied with an output from said operational amplifier as well as with a further reference signal and an AND-circuit which is supplied with an output derived from said flip-flop circuit as well as with said sampling signal, as output from said AND-circuit being applied to said sampling hold circuit.

8. In a solid state television camera having a solid state image sensor from which is derived a video signal, a compensation circuit comprising:
- a circuit means supplied with said video signal for level detecting the same and for producing a detected output signal;
- a source of reference signal;
- means utilizing the detected output signal and the reference signal to produce an initial control signal which occurs only in the presence of an undesired noise level;
- a source of sampling signal;
- means for combining the initial control signal and the sampling signal to eliminate sampling pulses from the sampling signal during the occurrence of the initial control signal and producing a final control signal;
- a sampling hold circuit to which is supplied said video signal; and
- means supplying said final control output to said sampling hold circuit.

* * * * *